US007385192B2

(12) United States Patent
Haase et al.

(10) Patent No.: US 7,385,192 B2
(45) Date of Patent: Jun. 10, 2008

(54) LASER SYSTEM FOR THE IONIZATION OF A SAMPLE BY MATRIX-ASSISTED LASER DESORPTION IN MASS SPECTROMETRIC ANALYSIS

(75) Inventors: Andreas Haase, Bremen (DE); Markus Kayser, Bremen (DE); Jens Höhndorf, Bremen (DE); Armin Holle, Oyten (DE)

(73) Assignee: Bruker Daltonik, GmbH, Bremen (DE)

(*) Notice: Subject to any disclaimer, the term of this patent is extended or adjusted under 35 U.S.C. 154(b) by 301 days.

(21) Appl. No.: 11/351,350

(22) Filed: Feb. 9, 2006

(65) Prior Publication Data

US 2006/0186332 A1 Aug. 24, 2006

(30) Foreign Application Priority Data

Feb. 10, 2005 (DE) ..................... 10 2005 006 125

(51) Int. Cl.
*B01D 59/44* (2006.01)
*H01J 49/00* (2006.01)

(52) U.S. Cl. .................. 250/288; 250/423 P; 250/251; 250/282

(58) Field of Classification Search ................ 250/288, 250/423 P, 251, 282, 287, 289-300
See application file for complete search history.

(56) References Cited

U.S. PATENT DOCUMENTS 7,235,781 B2 * 6/2007 Haase et al. ................ 250/288
2003/0025074 A1 2/2003 Li

FOREIGN PATENT DOCUMENTS

| | | | |
|---|---|---|---|
| DE | 101 12 386 | A1 | 3/2001 |
| GB | 2376794 | A | 12/2002 |
| WO | 01/93309 | A1 | 12/2001 |
| WO | 2004/083810 | A1 | 9/2004 |
| WO | 2004/083810 | A2 | 9/2004 |
| WO | 2005/079360 | A2 | 1/2005 |
| WO | 2005/079360 | A2 | 9/2005 |

OTHER PUBLICATIONS

Rohrbacher et al., "Multiple-ion-beam time-of-flight mass spectrometer", Review of Scientific Instruments, vol. 72, No. 8, pp. 3386-3389, 2001.

* cited by examiner

*Primary Examiner*—Jack I. Berman
*Assistant Examiner*—Meenakshi S Sahu
(74) *Attorney, Agent, or Firm*—Law Offices of Paul E. Kudirka

(57) ABSTRACT

The invention relates to a laser system for the ionization of a sample by matrix-assisted laser desorption in mass spectrometric analysis. The invention consists in providing an adjustable laser system which, in one setting, generates a single intensity peak on the sample and, in another setting, a multiplicity of intensity peaks, with the half-width, intensity, spatial arrangement and/or degree of spatial modulation of the single intensity peak and/or the intensity peaks being adjustable.

21 Claims, 3 Drawing Sheets

LASER SYSTEM FOR THE IONIZATION OF A SAMPLE BY MATRIX-ASSISTED LASER DESORPTION IN MASS SPECTROMETRIC ANALYSIS

FIELD OF THE INVENTION

The invention relates to a laser system for the ionization of a sample by matrix-assisted laser desorption in mass spectrometric analysis.

BACKGROUND OF THE INVENTION

In the last 10 to 15 years, two methods for the soft ionization of biological macromolecules have prevailed in mass spectrometric analysis: matrix-assisted laser desorption/ionization (MALDI), and electrospray ionization (ESI). The biological macromolecules to be analyzed are termed analyte molecules below. With the MALDI method, the analyte molecules are generally prepared in a solid matrix on the surface of a sample support, whereas with the ESI method they are dissolved in a liquid. Both methods have a considerable influence on the mass spectrometric analysis of biological macromolecules in genomics, proteomics and metabolomics; their inventors were awarded the Nobel prize for chemistry in 2002.

In a prepared MALDI sample, there are $10^3$ to $10^5$ times as many matrix molecules as there are analyte molecules, and they form a polycrystalline matrix in which the analyte molecules are embedded, isolated in the interior of the crystals or at their grain boundaries. The prepared MALDI sample is irradiated with a short-time laser pulse, which is strongly absorbed by the matrix molecules. The pulsed laser irradiation means that the matrix is explosively transferred from the solid state into the gaseous phase of a vaporization cloud (desorption). The analyte molecules are usually ionized by being protonated or deprotonated in reactions with matrix molecules or matrix ions, the analyte ions being predominantly singly charged after leaving the vaporization cloud. The degree of ionization of the analyte molecules is only some $10^{-4}$. The term soft ionization is used when an analyte molecule is transferred separately into the gaseous phase and ionized without undergoing any bond breakage.

Despite the linear absorption by the matrix, matrix-assisted laser desorption/ionization is a nonlinear process, which for pulsed laser radiation with a duration of a few nanoseconds only starts above an intensity threshold of around $10^6$ watts per square centimeter. For soft ionization, the maximum intensity lies at an upper limit of approximately $10^7$ watts per square centimeter. With a typical duration of around ten nanoseconds, the stated intensity limits result in a fluence of the laser radiation between 10 and 100 millijoules per square centimeter.

The MALDI process is complex and affected by numerous factors, some of which are interdependent. Since the MALDI method was first published in 1988, many parameters have been investigated and varied. In spite of this, the processes in the matrix and in the vaporization cloud, which lead to the ionization of the analyte molecules, are still not completely understood and are still under intense research (K. Dreisewerd, Chem Rev. 103 (2003), 395-425: "The Desorption Process in MALDI").

The chemical parameters of the MALDI process, for example the matrix substances themselves, the concentration ratio between matrix and analyte molecules, and the preparation conditions, have been comprehensively researched. For analyte molecules of different chemical substance classes. such as proteins or nucleic acids, over one hundred different chemical matrix substances are known, such as sinapic acid, DHB (2,5-dihydroxy benzoic acid), CHCA (α-cyano-4-hydroxy cinnamic acid) or HPA (3-hydroxypicolinic acid). The matrix substances exhibit strong absorption in the wavelength range between 330 and 360 nanometers. A MALDI sample can be prepared in a number of different ways, for example with "dried droplet" preparation or thin layer preparation. In "dried droplet" preparation, the matrix substance is dissolved together with the analyte molecules in a solvent, applied to a sample support, and then dried slowly in air. In thin layer preparation, on the other hand, the matrix substance without analyte molecules is dissolved in a volatile solvent such as acetone or acetonitrile, and applied to the sample support. Compared with "dried droplet" preparation, the volatile solvent evaporates very quickly and facilitates the creation of a thin, homogeneous matrix layer. A solution with analyte molecules is then applied to the thin matrix layer, causing the latter to be partially dissolved again, and the analyte molecules are integrated into the matrix during the subsequent drying. Whereas in thin layer preparation a homogeneous MALDI sample with microcrystals is produced, in "dried droplet" preparation larger crystals are formed and the surface of the MALDI sample shows a distinct morphology with different sample thicknesses.

As far as the physical parameters of the MALDI process are concerned, until now the temporal duration of the laser pulses, the intensity in the laser focus, and the wavelength of the pulsed laser radiation have chiefly been considered.

Nowadays, commercially available mass spectrometers with MALDI mainly use pulsed laser systems in the ultraviolet spectral range (UV). A number of laser types and wavelengths are available: nitrogen laser (λ=337 nm), excimer lasers (λ=193 nm, 248 nm, 308 nm), Nd:YLF laser (λ=349 nm), and Nd:YAG laser (λ=266 nm, 355 nm). Only the nitrogen laser and the Nd:YAG laser at a wavelength of 355 nanometers are of commercial interest for the MALDI method far and away the most frequently used. The laser medium of the nitrogen laser is a gas, whereas with the Nd:YAG laser it is a YAG (yttrium aluminium garnet: $Y_3Al_5O_{12}$) crystal doped with neodymium ions. With the Nd:YAG laser, the strongest laser line, at a wavelength of 1064 nanometers, is turned into the stated wavelengths in nonlinear optical crystals. The duration of the laser pulses used in the MALDI method is typically between 1 and 20 nanoseconds in the UV. In the academic field, however, pulse durations in the region of picoseconds have also been used.

For the MALDI method, laser systems which emit in the infrared spectral region (IR): Er:YAG (λ=2.94 μm) and CO2 (λ=10.6 μm) are also occasionally used in the field of research. Whereas with the UV-MALDI method the matrix molecules are supplied with energy via excited electronic states, in the IR-MALDI method molecular oscillations of the matrix molecules are excited. The pulse duration of the IR laser systems in the IR-MALDI method are between 6 and 200 nanoseconds. In contrast to the UV-MALDI method, both solid matrices and liquid matrices, for example glycerine, are used in the IR-MALDI method.

The laser systems used in the MALDI method differ not only in their wavelength but also in their spatial beam profile. For solid-state lasers such as the Nd:YAG laser or the Er:YAG laser, the laser medium is a crystal doped with ions. The laser medium is located in an optical resonator, which ensures that the spatial beam profile consists of one transverse fundamental mode or a few transverse beam modes. The radial intensity distribution of the transverse fundamental mode corresponds to a Gaussian function and is rotationally symmetric to the direction of propagation of the laser radiation. A laser beam like this can be focused to a minimum diameter which is limited only by the diffraction.

The nitrogen laser at a wavelength of 337 nanometers is by far the most frequently used type of laser in the MALDI method, this wavelength being the most intensive laser line of the nitrogen laser. The laser medium used is gaseous nitrogen, which is excited by means of an electrical discharge between two electrodes elongated along the beam direction. Since the most intensive laser line exhibits a high amplification, a laser pulse can remove the population inversion of the energy states even if it passes along the electrodes only once. Even when using a resonator with mirrors, many transverse beam modes are superimposed in the beam profile of the nitrogen laser, with the result that the minimum diameter of a laser focus in commercial nitrogen lasers at a wavelength of 337 nanometers is only around three micrometers. The typical diameter of the area irradiated in MALDI applications is around 20 to 200 micrometers. The beam profile has a rectangular shape at the front side of the two electrodes, the geometrical dimensions of the beam profile being determined by the width and spacing of the discharge electrodes. The intensity distribution inside of the rectangular shape is approximately homogenous (i.e. flat-top beam profile). The repetition rate of the laser pulses in the nitrogen laser is limited to around 100 hertz unless provision is made for a rapid gas exchange. Nitrogen lasers with a typical repetition rate of 50 hertz are used for MALDI applications.

In practice, the electrical gas discharge in the nitrogen laser is not the same pointing the discharge volume between the electrodes generating a spatially inhomogeneous amplification profile. The inhomogeneous amplification does not even out during the short time the laser is in action, but instead transfers to the intensity distribution of the beam profile of the nitrogen laser. The nitrogen laser thus has a spatially modulated flat-top beam profile with intensity maxima and minima, which is imaged onto the sample or focused onto it. These inhomogeneities being inherently present in the beam profile of the nitrogen laser lead to an intensity distribution of the laser radiation on the sample being spatially modulated and always exhibiting a multiplicity of intensity peaks.

The pulsed solid-state lasers used until now in the MALDI method usually have a beam profile which comes very close to a single Gaussian beam mode. If a pulsed laser beam is focused or imaged onto the sample, then at the location of the sample there is a Gaussian intensity distribution with a single intensity peak. The width of an intensity peak is generally given by the so-called half-width. In the region of the half-width, the intensity is greater than half the maximum intensity of the intensity peak. With solid-state lasers in the UV, the half-width can theoretically be less than one micrometer, but in MALDI applications it is typically between 20 and 200 micrometers. Even if laser pulse repetition rates of several hundred kilohertz are possible in principle with solid-state lasers, most current MALDI applications operate with a repetition rate of up to 200 hertz. The energy fluctuations from laser pulse to laser pulse are typically smaller in the case of solid-state lasers than with nitrogen lasers.

According to the prior art, the attempt is often made to achieve a spatially homogeneous intensity distribution on the sample in order to even out the inhomogeneities of the prepared MALDI sample, which occur, for example, in the case of non-uniform embedding of the analyte molecules in the matrix. In order to obtain a homogeneous intensity distribution on the sample with a Gaussian beam profile of a solid-state laser, the beam profile can be spatially homogenized by propagation in a fiber, and then imaged onto the sample. To facilitate this, the laser beam is coupled into a fiber in which a large number of transverse fiber modes with differing radial intensity distributions can propagate (multimode fibers). The propagation of the coupled laser beam in the multimode fiber means that energy is transferred out of the Gaussian beam mode and into a large number of transverse fiber modes which are superimposed at the output of the fiber. If the temporal coherence of the laser radiation used is sufficiently low, or the multimode fiber is sufficiently long, the intensity distribution at the end of the fiber is given by the sum of the intensity distributions of the individual transverse fiber modes. The large number of transverse fiber modes with differing radial intensity profiles thus results in a homogeneous intensity distribution at the end of the fiber. If the end of the multimode fiber is now imaged, a flat-top intensity distribution is also obtained on the sample. This method of homogenizing the beam profile is also used with the nitrogen laser to minimize the inherent inhomogeneities in the beam profile.

The quality of a mass spectrometric analysis is generally determined by the following parameters: mass accuracy, mass resolution, detection power, quantitative reproducibility and signal-to-noise ratio. The quality of a mass spectrometric analysis increases if at least one parameter is improved and the other parameters do not deteriorate as a result. The mass accuracy includes both a systematic deviation of the measured average ion mass from the true ion mass (mass trueness, or rather the deviation from mass trueness) and the statistical variance of the individual measured values around the mean of the ion mass (mass precision). The mass resolution determines which ion masses in the mass spectrometric analysis can still be distinguished. In practice, however, it is not only the quality but also the robustness of the mass spectrometric analysis that is important. A mass spectrometric analysis is robust if its quality changes little when the measuring parameters, for example the energy of the laser pulses or the preparation conditions of the MALDI sample, are The ion signal of a mass spectrometer with MALDI is proportional to the ionization efficiency, to the desorbed sample volume and to the concentration of the analyte molecules in the sample. The ionization efficiency is given by the number of analyte ions, which can be evaluated, divided by the number of analyte molecules in the desorbed sample volume, i.e., the percentage of analyte molecules from the sample volume ablated by the laser irradiation which are available as ions for a mass spectrometric analysis. If analyte molecules are already present in the matrix as ions before the desorption process, the number of analyte molecules is increased by the number of analyte ions being already ionized. Since the desorbed sample volume can be relatively easily increased by the irradiated sample area and by the fluence, the ionization efficiency represents an important parameter for the optimization of the MALDI process. A high ionization efficiency permits a high detection power because a maximum ion signal at low concentration (or at low sample consumption) is achieved. With a typical degree of ionization of only $10^{-4}$ it is possible to considerably improve the MALDI process. The definition of the ionization efficiency of the MALDI process also takes into account the losses which arise as a result of a fragmentation of analyte molecules during the transfer into the gaseous phase, and therefore reduce the number of analyte ions which can be evaluated.

For mass spectrometric analysis of the analyte ions generated in the MALDI process, conventional sector field mass spectrometers and quadrupole mass spectrometers are suitable in principle, as are quadrupole ion trap mass spectrometers and ion cyclotron resonance mass spectrometers. However, particularly suitable are time-of-flight mass spectrometers with axial injection, which require a pulsed current of ions to measure the time of flight (TOF). In this case, the starting point for the time of flight measurement is dictated by the ionizing laser pulse. The MALDI process was originally developed for use in a vacuum. In more recent developments, matrix-assisted laser desorption/ionization is also used at atmospheric pressure (AP MALDI) or intermediate pressure. Here, the ions are generated with a repetition rate of up to 2 kilohertz and fed, with the help of an ion guide, to a with orthogonal injection (OTOF "orthogonal time of flight"), a quadrupole ion trap mass spectrometer or an ion cyclotron resonance mass spectrometer. In an OTOF mass spectrometer, the ions generated in the MALDI process can be fragmented and stored before the measurement of the time of flight is started by an electronic pulsed injection.

With specific analytical methods, the intensity on the sample is increased to such a degree that the ions generated have enough intrinsic energy to dissociate. Depending on the time between the generation of the ions and their dissociation, this is termed a decay within the ion source (ISD or "in-source decay") or outside the ion source (PSD or "post-source decay").

Moreover, there are also methods of imaging mass spectrometry analysis (IMS) in which the MALDI process is used to generate the ions. With IMS, a thin section of tissue obtained, for example, from a human organ, using a microtome, is prepared with a matrix substance, and mass spectrometrically analyzed with spatial resolution. The spatial resolution of the mass spectrometric analysis can be done either by scanning individual small spots of the tissue section or by stigmatic imaging of the ions generated. With the scanning method, the pulsed laser beam is focused onto a small diameter on the sample, and a mass spectrum is measured for each individual pixel. A one- or two-dimensional frequency distribution is produced for individual proteins from the large number of individual spatially resolved mass spectra. With stigmatic imaging, an area of up to 200 by 200 micrometers is irradiated homogeneously with a laser pulse. The ions generated in this way are imaged pixel by pixel onto a spatially resolving detector by an ion optic. Until now it has only been possible to scan the frequency distribution of one ion mass with a single laser pulse because spatially resolving ion detectors that operate fast enough are not available. The measured ion mass can be varied from laser pulse to laser pulse, however.

SUMMARY OF THE INVENTION

The basis of the invention presented here is the far-reaching realization that the quality and the robustness of the mass spectrometric analysis of ions generated using the MALDI method with different chemical parameters (e.g., sample preparations), analytical methods and mass spectrometers are essentially determined by the intensity distribution on the MALDI sample. A laser system according to the invention comprises an adjustable optical device spatially modulating the laser radiation and providing an intensity distribution of the laser radiation on the MALDI sample that comprises a single intensity peak in one setting of the adjustable optical device or a multiplicity of intensity peaks in another setting. Furthermore, the half-width and/or the intensity of the single intensity peak can be adjusted with a laser system according to the invention. A multiplicity of intensity peaks is to be understood as a minimum of two intensity peaks, some or all of which are adjustable in terms of their half-width, intensity, spatial arrangement and/or degree of spatial modulation using a laser system according to the invention. The number of intensity peaks can also be changed. The degree of spatial modulation is commonly defined as the difference between the maximum of an intensity peak and the minimum intensity in the region adjacent to the intensity peak divided by the sum of both intensities: (Maximum−Minimum)/(Maximum+Minimum). The degree of spatial modulation takes values between zero (e.g. homogeneous intensity distribution) and one (e.g. single intensity peak without background).

In complete contrast to the prior art, it has proven to be the case that an intensity distribution with a multiplicity of fine intensity peaks is advantageous for the quality and robustness of the mass spectrometric analysis, particularly if the MALDI samples are produced with thin layer preparation. Analyzing the analyte ions in a time-of-flight mass spectrometer with axial injection produces a considerable improvement in the ionization efficiency, the mass resolution, and the signal-to-noise ratio compared to a spatially homogeneous intensity distribution and an intensity distribution with only a single broad intensity peak. The spacing between adjacent intensity peaks is preferably less than 500 micrometers, more preferably less than 250 micrometers and most preferably less than 50 micrometers or even less than 10 micrometers. The degree of spatial modulation is preferably in the range of 1/5 to 1 and most preferably in the range of 2/5 to 9/10. The half-width of the intensity peaks is preferably less than 50 micrometers, more preferably less than 25 micrometers and most preferably less than 10 micrometers, depending on the spacing and on the degree of spatial modulation. If the sample is prepared according to the dried droplet method, on the other hand, an intensity distribution with a single, relatively broad intensity peak can, surprisingly, exhibit advantages over an intensity distribution with many fine intensity peaks. A broad intensity peak has a half-width of more than 50 micrometers, whereas a fine intensity peak has a half-width of less than 50 micrometers.

Different intensity distributions are advantageous particularly in the case of the two methods of imaging mass spectrometry analysis. To achieve a high spatial resolution of the mass spectroscopic analyses in the raster method, the intensity distribution on the sample should consist of a single fine intensity peak with narrow half-width. A multiplicity of fine intensity peaks, on the other hand, can favor stigmatic imaging, since in the case of thin layer preparation, optimized ionization efficiency increases the number of analyte ions generated on the irradiated surface. If, in addition, the positions of the intensity peaks on the sample are known, it is easy to assign the spatially resolved detector signal to a location on the sample.

A laser system according to the invention generally comprises a laser medium, means for exciting the laser medium, an optical resonator and optical and electrooptical components to modulate the laser radiation both spatially and temporally. In the following, a laser system is understood to be the complete set-up comprising optical, electrical and electrooptical components which are necessary to generate and modulate the laser radiation beginning at the laser medium and ending at the MALDI sample. The adjustable optical device for spatial modulation of the laser radiation can be located both inside the optical resonator, in the vicinity of the laser medium, and also outside the optical resonator. The adjustable optical device may include lenses, lens arrays (comprising a large number of lenses), mirrors, reflection optics, active Q-switches for pulse generation, diffractive optical elements (e.g., gratings) and nonlinear optical crystals. To those skilled in the art it will be apparent that not all the components mentioned have to be used in one laser system according to the invention, and that they can be supplemented by further components.

In contrast to the prior art, a laser system according to the invention can generate quite different intensity distributions on the MALDI sample, and these different intensity distributions permit optimization of the quality and robustness of the mass spectrometric analysis for the respective chemical parameters, analytical respective conditions either manually or automatically using control software by varying the number and/or the half-width and/or spatial arrangement and/or degree of spatial modulation of the intensity peaks. It will be apparent to those skilled in the art that it is possible to realize a laser system according to the invention in a wide variety of embodiments.

BRIEF DESCRIPTION OF THE DRAWINGS

The above and further advantages of the invention may be better understood by referring to the following description in conjunction with the accompanying drawings in which.

DETAILED DESCRIPTION

Figure 1:
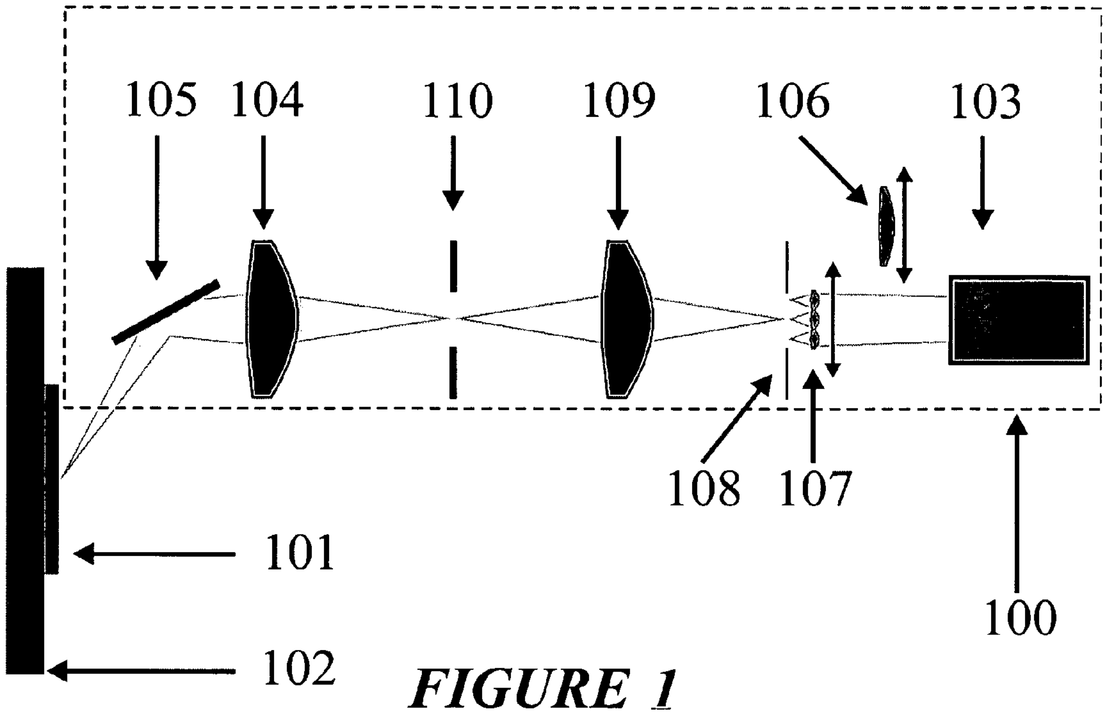
FIG. 1 illustrates a laser system in which a lens array and a spherical lens can be moved at right angles to the optical axis of the laser system.

FIG. 1 shows a first embodiment of a laser system (100) according to the invention. The laser unit (103) is an Nd:YLF laser which generates a temporally pulsed laser beam at a frequency-tripled wavelength of 349 nanometers. The active laser medium here is a crystal ($LiY_{1.0-x}Nd_xF_4$) doped with neodymium ions. The laser pulses of the Q-switched laser unit have duration of around 10 nanoseconds. To a good approximation, the spatial beam profile corresponds to a single Gaussian beam mode. The energy of the laser pulses can be adjusted by means of an attenuator integrated into the laser unit (103). The type of laser medium and the wavelength produced by the laser unit (103) are not important for any embodiment of the present invention; all wavelengths suitable for the MALDI process can be used equally well.

A mechanical set-up can be used to move the lens (106) and the lens array (107) into the beam path of the laser system (100), one after the other, so that the rear focal planes of the lens (106) and the lens array (107) are in the plane of the diaphragm (108). A type of revolver mechanism is the obvious choice for this, as is familiar from microscopy for different objectives. The lens array (107) and the lens (106) generate a spatial intensity distribution in the plane of the diaphragm (108); this intensity distribution consists of a multiplicity of intensity peaks or a single intensity peak. The diaphragm (108) is imaged into the intermediate image plane (110) by the lens (109), and the intermediate image plane, in turn, is imaged onto the sample (101) in reduced size by the lens (104) and the deflection mirror (105). The magnification typically amounts to around 1:6. The use of the intermediate image plane (110) is advantageous for the design since the mechanical and optical elements required to generate the different intensity distributions can be arranged in the beam path at a distance from the sample.

Together with other samples not shown, the sample (101 ) is prepared on the sample support (102) and contains the analyte molecules integrated into a solid matrix. If the threshold intensity for the MALDI process is exceeded on the sample (101), the explosive vaporization of the matrix begins. The analyte molecules are transferred with the matrix into the gaseous phase, and a certain proportion of them are present as analyte ions in the vaporization cloud. The deflection mirror (105) spatially uncouples the laser system (100) from the mass spectrometer (not shown), making it easier to transfer the ions generated in the MALDI process into the mass spectrometer.

The lens array (107) has a base area of 25 square millimeters, on which spherical lenses are arranged in a square grid with a typical spacing of 120 micrometers. Each single lens of the lens array (107) has a focal length of some 10 millimeters. The intensity peaks on the sample are 20 micrometers apart and have a half-width of 10 micrometers. The single lens (106) has a focal length of 25 millimeters and generates a single intensity peak with a half-width of around one micrometer on the sample.

Between the intensity peaks, the sample (101) may not be uniformly ionized at all positions. In order to use up the sample (101) as completely as possible with a sequence of laser pulses, it may therefore be necessary to change the location of the intensity peaks relative to the sample (101). This can be achieved, for example, by tilting the deflection mirror (105) during a sequence of laser pulses or moving the sample support (102). It is also possible to move the imaging lens (109) at right angles to the optical axis.

If a zoom lens is used in the laser system (100) instead of the lens (109), the magnification between the planes of the diaphragms (108) and (110) can be advantageously adjusted so that the separation between the diaphragms (108) and (110) remains. A variable magnification makes it possible to adjust both the distance between the intensity peaks and the half-width of the individual intensity peaks, for example. The single intensity peak can be steadily changed from a fine intensity peak with a half-width of less than 10 micrometers to a broad intensity peak with a half-width greater than 100 micrometers.

Furthermore, the lens array (107) can also comprise a large number of cylindrical lenses which generate a large number of line foci in the rear focal plane. The line foci can likewise be understood as intensity peaks but ones which have two different half-widths longitudinally and transversely to the line focus. Apart from the lens (106) and the lens array (107), it is, of course, possible to use the same mechanical set-up to move additional lenses or lens arrays into the beam path so that more than two different intensity distributions can be generated in the plane of the diaphragm (108), and hence on the sample (101).

The degree of spatial modulation on the sample (101) can be varied by intentionally induce optical aberrations, e.g. by moving lenses used in the laser system (100) away from the conditions of imaging. The optical aberrations cause that the intensity between intensity peaks does not disappear completely and therefore decrease the degree of modulation.

Figure 2A:
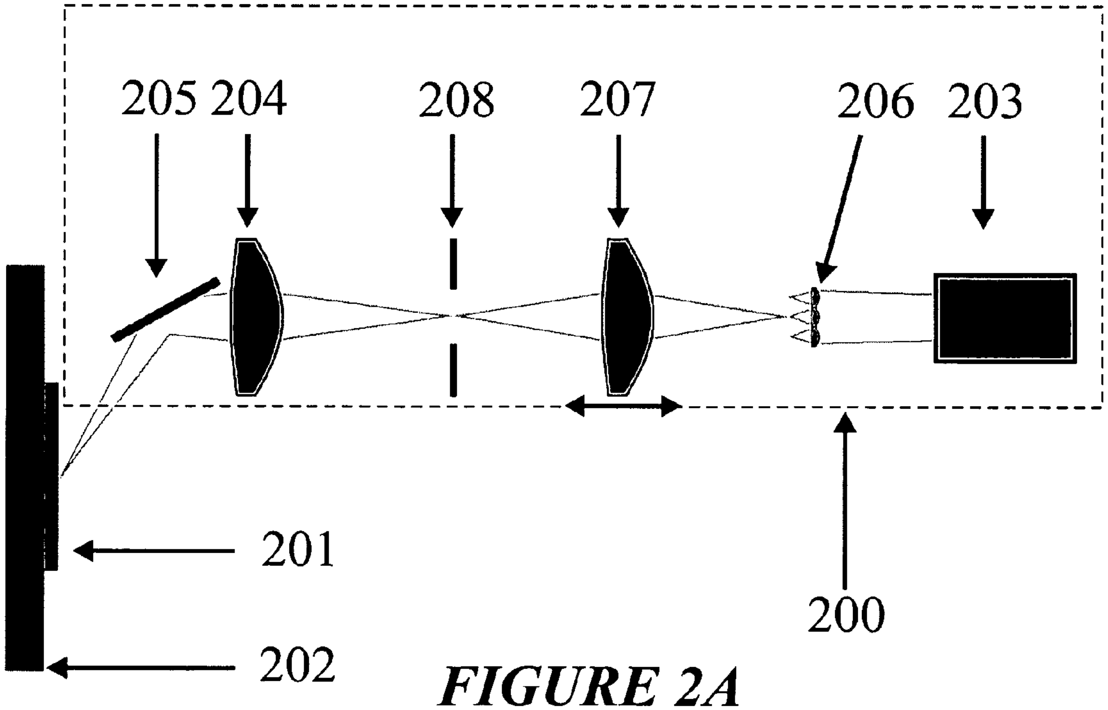
FIGS. 2*a* to 2*c* illustrate a laser system in which a spherical lens can be moved along the optical axis, whereby various optical planes behind a lens array are imaged in a reduced size onto the sample.
Figure 2B:
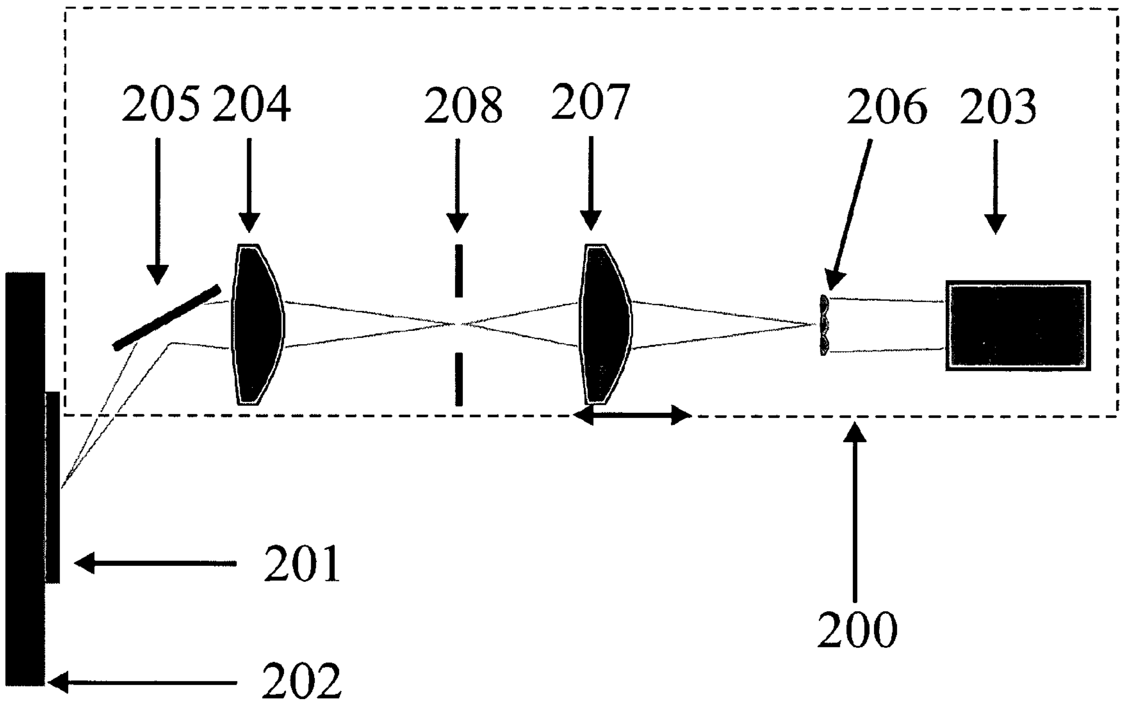
Figure 2C:
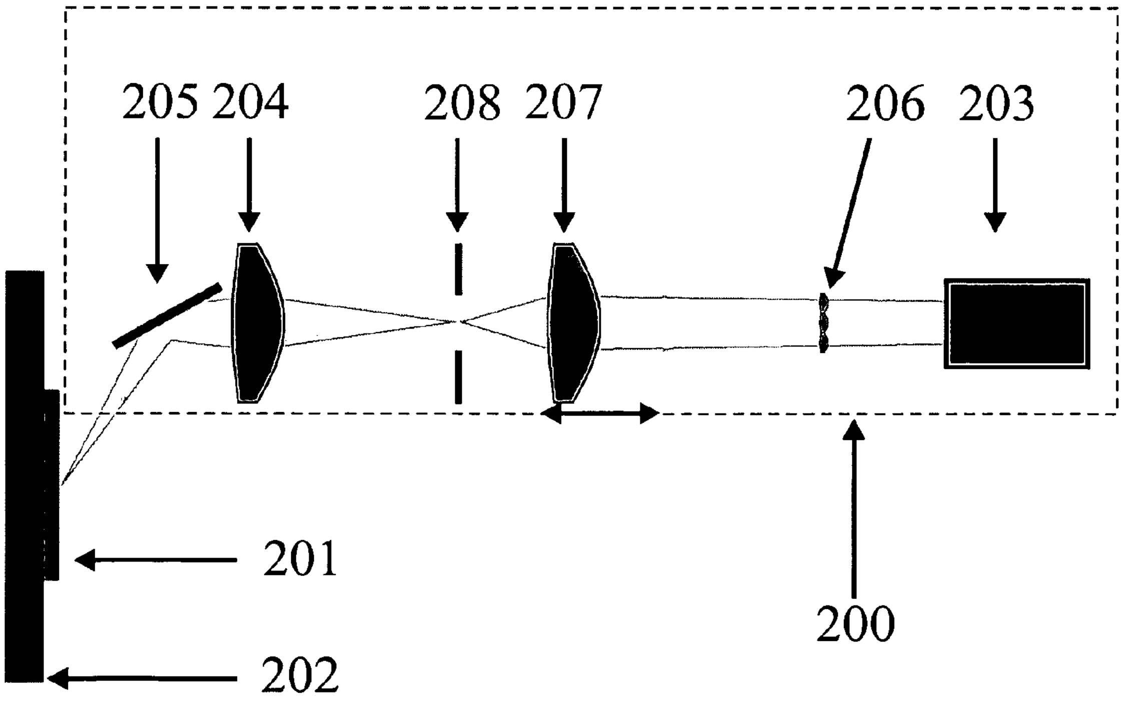

FIGS. 2*a* to 2*c* show a second embodiment of a laser system (200) according to the invention. The laser unit (203) is an Nd:YAG laser which generates a temporally pulsed laser beam at a frequency-tripled wavelength of 355 nanometers. The laser pulses of the Q-switched laser unit (203) have durations of around 7 nanoseconds. The spatial beam profile is virtually a Gaussian beam of the laser pulses can be adjusted by means of an attenuator integrated into the laser unit (203).

In FIG. 2*a* the lens array (206) generates a multiplicity of intensity peaks in the rear focal plane. As in the first embodiment, the lens array (206) comprises a large number of spherical lenses and has similar geometric parameters. The whole lens array (206) is made completely of fused silica. The lens (207) images the rear focal plane of the lens array (206) 1:1 into the intermediate image plane (208), which, in turn, is imaged reduced by a factor of eight, onto the sample (201) by the lens (204). The individual foci of the lens array (206) are therefore imaged in reduced size onto the sample; a multiplicity of intensity peaks is formed here. In contrast to the first embodiment, the lens array (206) always stays in the same optical plane, whereas the lens (207) in FIGS. 2*a* to 2*c* is moved along the optical axis.

In FIG. 2*b* the lens (207) has been moved toward the intermediate image plane (208) so that the plane directly behind the lens array (206) is imaged in reduced size into the intermediate image plane (208). Since the laser beam is imaged directly behind the lens array (206), and the lens array (206) is not very thick and is also transparent, a reduced image of the laser beam is formed in the intermediate image plane (208). In front of the lens array (206) the laser beam has a diameter of around one millimeter. The two lenses (204) and (207) generate a single intensity peak with a half-width of around 80 micrometers on the sample. If the lens (207) is moved toward the lens array (206) and images it onto the intermediate image plane (208) in enlarged form, a single intensity peak with a half-width of around 200 micrometers is produced on the sample (201).

In FIG. 2*c* the lens (207) is positioned a single focal length in front of the intermediate image plane (208) and it focuses the laser beam. The intensity distribution in the intermediate image plane (208) has further side maxima in addition to a dominating main maximum. The side maxima arise as a result of the diffraction of the laser beam at the lens array (206). The main maximum corresponds to the zeroth order of diffraction. Since the lens array (206) has relatively coarse structures, in the region of 100 micrometers, the intensities of the side maxima are orders of magnitude less than the intensity of the main maximum. The half-width of the main maximum in the intermediate image plane (208) is around 5 micrometers. Owing to optical aberrations and the limited resolution, the main maximum of the intensity distribution on the sample (201) has a half-width of merely 3 micrometers. The intensities of the side maxima on the sample (201) are so low that the threshold for the MALDI process is not achieved there, and so the MALDI process only occurs in the region of a single fine intensity peak.

In order to use up the sample (201) uniformly between the intensity peaks as well, the lens array (206) is preferably turned so that the positions of the intensity peaks on the sample (201) are changed. The sample (201) and further samples on the sample support (202) can be spatially scanned in succession with a single intensity peak by moving the sample support (202). The fine intensity peak generated with the laser system (200) in FIG. 2*c* is eminently suitable for achieving a high-resolution in an imaging mass spectrometry analysis with the raster scan method.

A very advantageous extension of the second embodiment consists in the fact that so-called fractal Talbot planes behind the rear focal plane of the lens array (206) are also imaged into the intermediate image plane (208). The Talbot effect occurs with all periodic structures, and hence also with the lens array (206) (K. Besold et al., Pure Appl. Opt. 6 (1997), 691-698: "Practical limitations of Talbot imaging with microlens arrays"). The distance $z_T$ of the Talbot plane from the rear focal plane of the lens array (206) is given by the spacing p of the periodically arranged lenses of the lens array (206) and by the wavelength $\lambda$:$z_T=2\cdot p^2/\lambda$. In the Talbot plane, intensity peaks occur which are arranged like the lens foci in the rear focal plane of the lens array (206). It is interesting that between the rear focal plane and the Talbot plane there are also fractal Talbot planes in which the number of intensity peaks is multiplied and the half-width reduced. By imaging suitable fractal Talbot planes it is therefore even possible to adjust the spacing of the intensity peaks on the sample (201). In particular, it is also possible to adjust the degree of spatial modulation of the intensity peaks by not imaging the fractal Talbot planes in sharp focus; by this means the intensity between the intensity peaks does not disappear completely.

Figure 3:
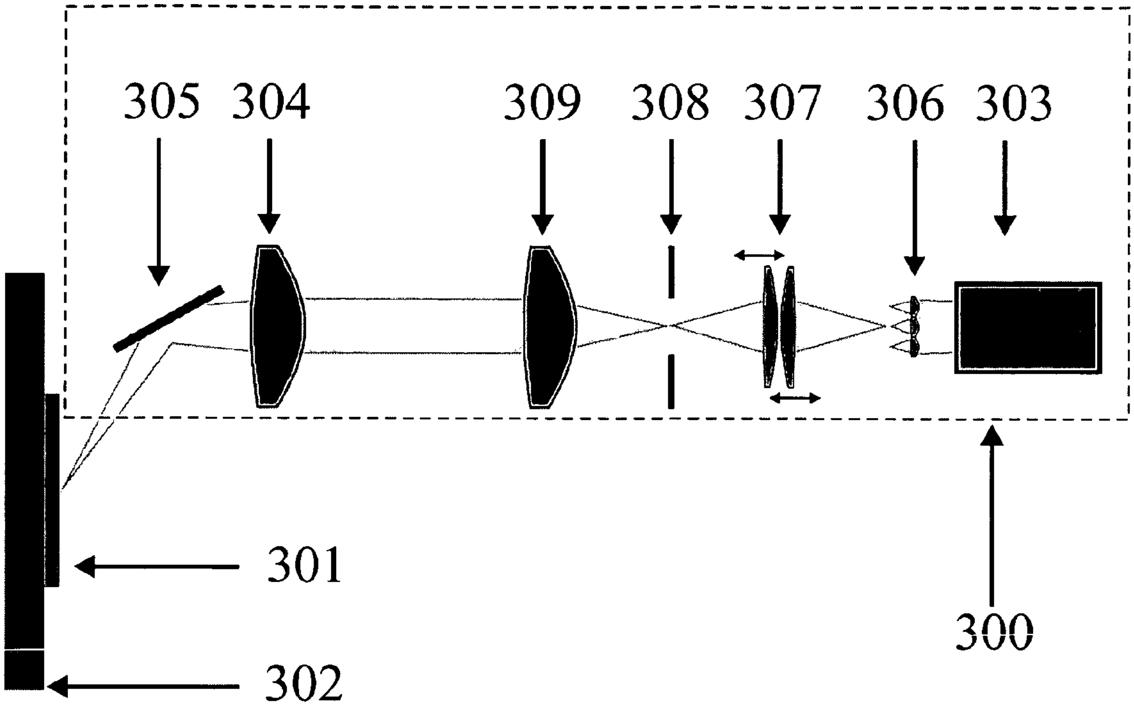
FIG. 3 illustrates a laser system in which a large number of parallel beams are generated, all of which have different directions to the optical axis and which are focused onto the sample by a spherical lens.

FIG. 3 shows a third embodiment of a laser system according to the invention (300). The laser unit (303) here is again an Nd:YAG laser which generates a temporally pulsed laser beam at a frequency-tripled wavelength of 355 nanometers. The spatial beam profile is virtually a Gaussian fundamental mode. The energy of the laser pulses can be adjusted by means of an attenuator integrated into the laser unit (303).

The lens array (306) generates a multiplicity of intensity peaks in the rear focal plane which are imaged by a zoom lens (307) into the front focal plane (308) of the lens (309). The geometric and optical parameters of the lens array (306) are similar to those of the first two embodiments. The zoom lens (307) comprises two spherical lenses which can be moved independently of each other. The lens (309) generates a bundle of parallel rays from each intensity peak in the focal plane (308), each bundle of rays having a different angle to the optical axis. For reasons of clarity, only the bundle of rays parallel to the optical axis is shown in FIG. 3. The sample (301) is located in the rear focal plane of the lens (304), so that the various bundles of parallel rays can be focused onto the sample (301). Since the bundles of parallel rays are incident on the lens (304) at different angles, each bundle of rays produces a single intensity peak which has a certain position on the sample (301) depending on the direction and angle of the bundle of rays. A multiplicity of intensity peaks are thus generated on the sample (301). The focal lengths of the lenses (304) and (309) determine the spacing of the intensity peaks on the sample (301) for a given spacing of the intensity peaks in the focal plane (308).

A significant advantage of this embodiment consists in that the distance between lenses (304) and (309) is not determined by the imaging condition, but is basically arbitrary. Furthermore, the zoom lens (307) can be used to continuously adjust the magnification between the rear focal plane of the lens array (306) and the focal plane (308). This provides a very advantageous way of adjusting the spacing of the intensity peaks on the sample (301). As illustrated in the second embodiment, it is naturally possible to also use fractal Talbot planes or other optical planes in which the intensity peaks have a greater periodicity or a lesser degree of spatial modulation.

Furthermore, the zoom objective (307) provides a very advantageous way of also imaging the plane directly behind the lens array (306) into the focal plane (308). This generates a single intensity peak in the focal plane (308), and this intensity peak is transmitted by the two lenses (304) and (309) onto the sample (301). The zoom lens can be used to continuously change the magnification and to adjust the naif-width of the single intensity peak on the sample (301).

As is the case with the first two embodiments, the sample (301) can be uniformly used up by changing the position of the intensity peaks on the sample (301) during a sequence of laser pulses. This can be achieved, for example, by tilting the deflection mirror (305), or moving the sample support (302), or preferably by turning the lens array (306). Furthermore, the imaging of a single intensity peak or the multiplicity of intensity peaks into the intermediate planes ((108), (208), (308)) or directly onto the sample ((201), (301)) can be realized by different kinds of variable optical systems comprising for example lenses, zoom lenses or.

Instead of the lens arrays ((107), (206), (306)), it is also possible to use a combination of a Dammann grating and a single spherical lens to generate a multiplicity of intensity peaks. A Dammann grating is a diffractive optical element (DOE) which diffracts the laser beam into different orders like a customary grating but which, in the process, distributes the laser beam uniformly over a large number of orders. The various diffraction orders of the Dammann grating, which can be viewed as bundles of parallel rays with different directions to the optical axis, are focused by the single spherical lens into the rear focal plane of this lens, producing a multiplicity of intensity peaks. It may be possible for the bundles of parallel rays to be entirely generated by a single Damman grating that is adjustable. Basically, an adjustable Damman grating of this type can consist of a programmable chip as used in liquid crystal displays or projectors.

With knowledge of this invention, those skilled in the art can design further embodiments of laser systems according to the invention.

What is claimed is:

1. A laser system for the ionization of a sample by matrix-assisted laser desorption in a mass spectrometric analysis, wherein the laser system comprises an adjustable optical device spatially modulating the laser radiation and providing an intensity distribution of the laser radiation on the sample that consists of a single intensity peak in one setting of the adjustable optical device and a multiplicity of intensity peaks in another setting.

2. The laser system according to claim 1, wherein the laser system comprises means for adjusting the half-width and/or the intensity and/or the degree of spatial modulation of the single intensity peak.

3. The laser system according to claim 1, wherein the laser system comprises means for adjusting the number of intensity peaks.

4. The laser system according to claim 1, wherein the laser system comprises means for adjusting the half-width and/or the intensity and/or the degree of spatial modulation and/or the spatial arrangement of intensity peaks.

5. The laser system according to claim 4, wherein the laser system provides intensity peaks with a half-width smaller than 50 micrometers.

6. The laser system according to claim 4, wherein the laser system provides intensity peaks with a degree of spatial modulation in the range of ⅕ to 1.

7. The laser system according to claim 1, wherein the laser system comprises a lens array, a spherical lens, means to move the lens array and the spherical lens into the beam path of the laser system, wherein the rear focal planes of the lens array and the spherical lens are at the same position, if moved into the beam path, and an optical system that images the rear focal planes onto the sample.

8. The laser system according to claim 1, wherein the laser system comprises a lens array and a variable optical system, one behind the other, in the beam path of the laser system, wherein the variable optical system images, in different settings, one of several optical planes located in front of and/or behind the lens array onto the sample.

9. The laser system according to claim 8, wherein the variable optical system images the plane directly behind the lens array and/or the rear focal plane of the lens array and/or a plane from infinity onto the sample.

10. The laser system according to claim 1, wherein the laser system comprises a lens array, a variable optical system, a first focusing optical system and a second focusing optical system, one behind the other, in the beam path of the laser system, wherein the variable optical system images, in different settings, one of several optical planes located behind the lens array into the front focal plane of the first focusing optical system, and wherein the sample is located in the rear focal plane of the second focusing optical system.

11. The laser system according to claim 10, wherein the variable optical system images the plane directly behind the lens array or the rear focal plane of the lens array into the front focal plane of the first focusing optical system.

12. The laser system according to claim 11, wherein the variable optical system comprises a zoom lens for imaging with an adjustable magnification.

13. The laser system according to claim 7, wherein the laser system comprises a means for moving or turning the lens array.

14. A method for the ionization of a sample by matrix-assisted laser desorption in mass spectrometric analysis, comprising the steps of:

a) providing the sample with analyte molecules, b) generating an intensity distribution on the sample by a laser system, wherein the intensity distribution comprises at least one intensity peak, c) ionizing analyte molecules, d) measuring the ionized analyte molecules mass spectrometrically, and e) varying the number and/or the half-width and/or spatial arrangement and/or degree of spatial modulation of the intensity peaks and repeating steps b) to e), until the quality and/or the robustness of the mass spectrometric analysis reach an optimum.

15. The method according to claim 14, wherein the optimized parameters are used for the mass spectrometric analysis of the analyte molecules in the sample.

16. A method for the ionization of a sample by matrix-assisted laser desorption in mass spectrometric analysis, comprising the steps of:

a) providing the sample with analyte molecules, b) generating a laser radiation, c) spatially modulating the laser radiation such that the intensity distribution of the laser radiation on the sample comprises a single intensity peak or a multiplicity of intensity peaks, wherein the spacing of the intensity peaks is less than 500 micrometers, d) ionizing the analyte molecules on the sample by the intensity distribution, e) measuring the ionized analyte molecules mass spectrometrically.

17. The method according to claim 16, wherein the spacing of the intensity peaks is less than 250 micrometers.

18. The method according to claim 16, wherein the spacing of the intensity peaks is less than 50 micrometers.

19. The method according to claim 16, wherein the half-width of intensity peaks is smaller than 50 micrometers.

20. The method according to claim 16, wherein the degree of spatial modulation of the intensity peaks is in the range of $1/5$ to 1.

21. The method according to claim 16, wherein the degree of spatial modulation of the intensity peaks is in the range of $2/5$ to $9/10$.

* * * * *